United States Patent [19]
Schmidt

[11] 3,881,996
[45] May 6, 1975

[54] RECOVERY OF PROPYLENE OXIDE BY PLURAL STAGE DISTILLATION
[75] Inventor: John P. Schmidt, Princeton, N.J.
[73] Assignee: Oxirane Corporation, Princeton, N.J.
[22] Filed: Nov. 21, 1973
[21] Appl. No.: 417,809

[52] U.S. Cl................. 203/71; 203/73; 260/348 R; 260/348 C; 260/348.5 R
[51] Int. Cl............................................. B01d 3/00
[58] Field of Search.......... 203/71, 73; 260/348.5 L, 260/248.5 V, 348.5 R, 348 R

[56]  References Cited
UNITED STATES PATENTS

| 3,251,862 | 5/1966 | Lidov | 260/348.5 L |
|---|---|---|---|
| 3,350,417 | 10/1967 | Binning et al. | 203/42 |
| 3,350,419 | 10/1967 | Mill et al. | 203/42 |
| 3,350,420 | 10/1967 | Faris | 203/42 |
| 3,350,421 | 10/1967 | Binning et al. | 203/42 |
| 3,351,635 | 11/1967 | Kollar | 260/348.5 L |
| 3,398,062 | 8/1968 | Tsao | 260/348.5 R |
| 3,580,819 | 5/1971 | Hoory et al. | 260/348.5 L |

Primary Examiner—Norman Yudkoff
Assistant Examiner—Frank Sever
Attorney, Agent, or Firm—Flynn & Frishauf

[57] ABSTRACT

Propylene oxide is recovered from a substantially propylene-free, crude propylene oxide product obtained by catalytic oxidation of propylene with an organic hydroperoxide. The crude product is distilled to remove acetaldehyde as an overhead product. A bottoms product is then distilled to separate propylene oxide as an overhead product from propionaldehyde and other higher boiling materials.

6 Claims, 1 Drawing Figure

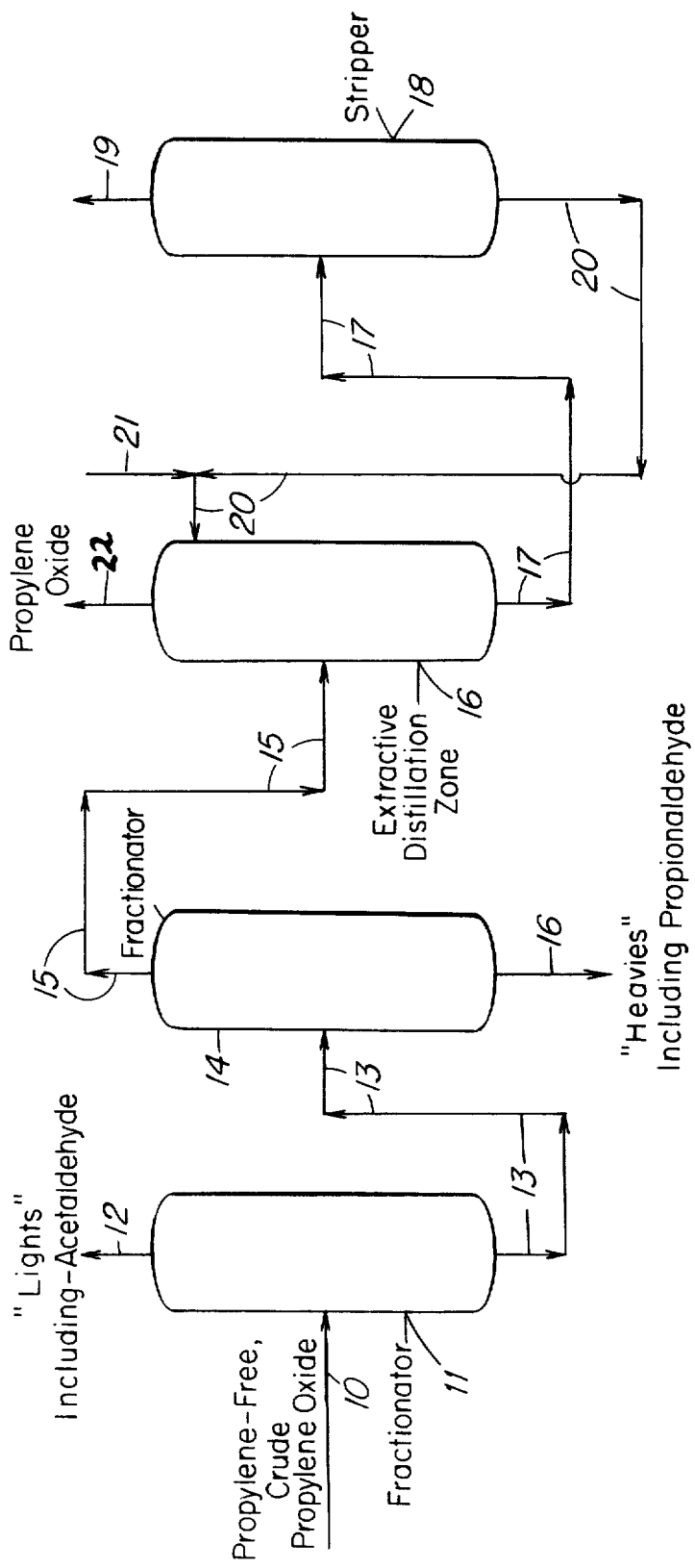

RECOVERY OF PROPYLENE OXIDE BY PLURAL STAGE DISTILLATION

FIELD OF THE INVENTION

This application has to do with the recovery of propylene oxide in a high state of purity from a substantially propylene-free, crude propylene oxide formed by the catalytic epoxidation of propylene with an organic hydroperoxide.

BACKGROUND OF THE INVENTION

Epoxidation of olefins with organic hydroperoxides in the presence of a variety of catalysts has been practiced extensively in recent years. Tertiary butyl hydroperoxide and ethylbenzene hydroperoxide have been found to be particularly useful in this regard. Typical processes are described in U.S. Pat. Nos. 3,350,442, 3,351,635, 3,453,218 and 3,523,956, the disclosure of each of which is incorporated herein by reference.

When propylene is used as the olefin the epoxidation products so produced generally contain a substantial quantity of unreacted propylene, propylene oxide and solvents, along with relatively minor quantities of acetaldehyde, propionaldehyde, acrylic aldehyde, acetone, methanol, hexenes and water. Fractionation of such products to obtain propylene oxide in a high state of purity (99.9 percent by weight and greater), has proven to be difficult, despite the substantial differences in boiling points of such components therein as:

| Component | Boiling Point, °C. |
|---|---|
| propylene | −47 |
| acetaldehyde | 21 |
| propylene oxide | 35 |
| propionaldehyde | 48.8 |
| acrylic aldehyde | 52.5 |
| water | 100 |
| ethylbenzene | 136 |

Separation of unreacted propylene from propylene oxide, by fractional distillation, has not been difficult. However, separation of aldehydes — generally present in amounts of up to about 2 percent by weight — has presented a problem, since a satisfactory propylene oxide for commercial purposes should contain less than about 100 parts per million (ppm), and preferably less than about 20 ppm, of aldehydes expressed as propionaldehyde. The analysis for total aldehydes at this level is generally carried out by iodometric titration.

To obtain a desired propylene oxide product, it has been the practice to remove substantially all unreacted propylene from a reaction product, then charge the crude propylene oxide (approximately 95 percent by weight of propylene oxide) to a distillation column and remove propylene oxide and all lower boiling materials, including acetaldehyde, as an overhead product. The overhead product is then fractionated in a second fractionator to remove acetaldehyde and materials having lower boiling points as an overhead product. The bottoms product from the second fractionator is then subjected to an extractive distillation, as with a $C_8$ paraffin, to remove hexenes and other hydrocarbons. A propylene oxide product containing about 50 to 100 ppm of total aldehydes (as propionaldehyde) is removed as an overhead product from the fractionator in which extractive distillation is conducted.

It has been found to be difficult to recover a propylene oxide containing an aldehyde content of as low as 50 ppm, because a substantial quantity, as much as 30 percent of the propylene oxide, has been lost in the second fractionator overhead containing acetaldehyde in recovering such a propylene oxide product.

It is an object of the present invention, therefore, to provide a process for recovering propylene oxide in a high state of purity without substantial loss from a substantially propylene-free, crude propylene oxide product, formed by catalytic epoxidation of propylene oxide with an organic hydroperoxide.

SUMMARY OF THE INVENTION

Surprisingly, it has been found that the sequence of the fractionation steps has a major effect on the final purity of the propylene oxide obtained, particularly with regard to aldehyde content. Substantially improved results are obtained when the removal of acetaldehyde and lower boiling materials precedes the step in which propylene oxide is separated from propionaldehyde and higher boiling material. Furthermore, this dependence of separation performance upon the sequence of distillation steps is so pronounced that it is of very major economic importance to employ the preferred sequence in order to achieve satisfactory purity at minimum loss of propylene oxide.

This result is highly unusual and is not in accord with customary calculable performance of fractional distillation equipment. It is believed that chemical reactions may be occurring during distillation which interfere with the normal mass transfer steps and thereby produce anomalous results.

In accordance with the present invention, there is provided a process for recovering propylene oxide from a substantially propylene-free, crude propylene oxide product obtained by the catalytic epoxidation of propylene with an organic hydroperoxide, the crude product including propylene oxide, acetaldehyde, propionaldehyde and materials boiling above propylene oxide. The process includes the sequential steps of:

a. passing the said crude propylene oxide product into a first fractionator, withdrawing therefrom a first distillation overhead containing acetaldehyde and any component of lower boiling point, and withdrawing therefrom a first distillation bottoms containing propylene oxide, propionaldehyde and said material boiling above propylene oxide, and b. passing the first distillation bottoms to a second fractionator, withdrawing therefrom a second distillation overhead containing propylene oxide substantially free of aldehydes and of said higher boiling material, and withdrawing therefrom a second distillation bottoms containing said higher boiling material.

The propylene oxide recovered as said second distillation overhead generally contains from about 5 ppm to about 50 ppm of aldehydes as propionaldehyde and preferably of the approximate range 5 – 20 ppm.

SPECIFIC EMBODIMENTS OF THE INVENTION

The present invention is now described with reference to the accompanying drawing which illustrates one embodiment of the process.

A crude propylene oxide product, from which unreacted propylene has been removed by prior distillation according to conventional fractional distillation operations, is charged through line 10 to an intermediate zone of first fractionator 11. Depending on the epoxidation conditions employed, the crude product generally has a composition of the following character, in percent by weight:

| propylene oxide | 92 - 99 |
| acetaldehyde | 0.05 - 2.0 |
| propionaldehyde and acrylic aldehyde | 0.01 - 0.10 |
| acetone | 0.01 - 0.30 |
| water | 0.3 - 5.0 |

Fractionator 11 is operated at conditions such that acetaldehyde and any lower boiling materials can be removed overhead through line 12 as a first distillation overhead, and substantially all higher boiling materials including propylene oxide are removed in a first liquid bottoms product through line 13. Fractionator 11 is preferably operated at a pressure of from about 15 pounds per inch absolute (psia) to about 100 psia and at a temperature of from about 35°C. to about 100°C. It is particularly advantageous to operate fractionator 11 such that the top zone thereof is at a pressure of about 45 psia and the bottom zone thereof is at a temperature of about 75°C. Fractionator 11 generally contains from 20 to 50 theoretical vapor-liquid contacting stages.

The first liquid bottoms in line 13 is charged to an intermediate zone of second fractionator 14, which is so operated that a second distillation overhead containing propylene oxide and substantially free of aldehyde is removed as a second distillation overhead through line 15. The second distillation overhead contains from about 5 to about 50 ppm of total aldehydes as propionaldehyde. Components of the crude propylene oxide product boiling above propylene oxide are removed as a second liquid bottoms through line 16. Fractionator 14 is operated advantageously at a pressure of from about 10 to about 50 psia and at a bottom zone temperature of from about 50°C. to about 100°C. and preferably from about 60°C. to about 90°C. Particularly preferred operation involves a pressure of about 20 psia in the top zone thereof and a temperature of about 80°C. in the bottom zone thereof. From about 20 to about 60 theoretical vapor-liquid contacting stages are included in fractionator 14.

As an optional embodiment to achieve greater propylene oxide purity, second distillation overhead in line 15 can be charged to an intermediate zone of extractive distillation column 16 wherein it is in countercurrent contact with an extractive solvent such as an octane, using conventional techniques for the extractive distillation of propylene oxide (e.g., U.S. Pat. No. 3,464,897). Propylene oxide of high purity, less than about 20 ppm of aldehyde as propionaldehyde, is removed from column 16 through overhead line 22. Components of the crude propylene oxide product boiling above propylene oxide are extracted in column 16 and are removed therefrom in an extract through bottoms line 17. The extract in line 17 is charged to an intermediate zone of stripper 18 which is so operated that said components having boiling points above propylene oxide are removed overhead via line 19 and said solvent is removed via bottoms line 20 for recycle to an upper zone of column 16. Make-up solvent can be added to line 20 from line 21. By way of illustration, column 16 can be operated at a pressure of from about 15 to about 100 psia, with a ratio of from about 2 to about 20 parts by volume of solvent per volume of charge from line 15. Stripper 18 can be operated at a pressure of from about 15 to about 100 psia.

The process of this invention is illustrated further by the following typical examples with reference to the drawing.

EXAMPLE 1

A crude propylene oxide product, 100 parts by weight, of the following composition was charged from line 10 to fractionator 11:

| | Percent by Weight |
|---|---|
| low boilers | trace |
| acetaldehyde | 0.7 |
| propionaldehyde | 0.04 |
| ethylbenzene | 0.6 |
| hexenes | 0.05 |
| water | 4.5 |
| acetone | 0.2 |
| propylene oxide | balance. |

Removed overhead from fractionator 11 through line 12 was about one part by weight comprising acetaldehyde, propylene oxide and low boilers. Bottoms product in line 13 comprised 99 parts by weight. Fractionator 11 contained 90 trays and was operated at 42 psia and a bottoms temperature of 75°C., with a reflux/feed ratio of 4.

The overhead product taken from fractionator 14 through line 15 comprised 93 parts by weight of propylene oxide having a total aldehyde content of about 10 ppm as propionaldehyde. Bottoms product in line 16 comprised 6 parts by weight. Fractionator 14 contained 62 trays and was operated at 20 psia and a bottoms temperature of about 75°C., with a relfux/feed ratio of 7.

As indicated, therefore, propylene oxide of a high degree of purity, 10 ppm aldehyde content, was obtained with a propylene oxide loss of only about 1 percent, based upon the charge to fractionator 11.

COMPARATIVE EXAMPLE 1A

In a comparative example the sequence of distillations was reversed, so that the heavy ends removal step (fractionator 14) preceded the light ends removal step (fractionator 11). Each distillation tower was operated at the same pressure, temperature, reflux rate and number of trays as in Example 1.

Propylene oxide was removed in a first distillation overhead (fractionator 14) together with acetaldehyde and low boilers, and thereafter this first distillation overhead was fractionated to remove the acetaldehyde and low boilers and recover propylene oxide as a bottoms product.

This reversed sequence has the advantage of early separation of water from propylene oxide and thereby minimizes loss of oxide to glycol. However, the recovered propylene oxide contained greater than 50 ppm of aldehydes. Furthermore, more than 10 percent of the propylene oxide in the crude product was lost in the fractionation operations, mainly in the acetaldehyde fraction, and it was not possible to reduce this loss without greatly increasing the aldehyde concentration in the recovered propylene oxide.

Analysis of the recovered propylene oxide from the bottoms of the second distillation showed no paraldehyde.

EXAMPLE 2

The distillations in Example 1 were repeated at different levels of bottoms temperature in fractionator 14. At 93°C. bottoms temperature the propylene oxide recovered in line 15 contained about 15 ppm total aldehyde as propionaldehyde. At 99°C. bottoms temperature the propylene oxide recovered in line 15 contained about 30 ppm aldehyde. At 104°C. bottoms the aldehyde concentration was about 160 ppm.

The crude propylene oxide used in the illustrated examples was prepared by reacting propylene with ethylbenzene hydroperoxide in the presence of molybdenum at 110°C., followed by fractional distillation of the resulting reaction product to remove substantially all of the unreacted propylene therefrom.

It is to be understood that peroxides, catalysts and reaction parameters and procedures described in said U.S. Pat. Nos. 3,623,956, 3,350,422, 3,351,635 and 3,453,218, can be used herein, to obtain a substantially propylene-free, crude propylene oxide product, and that the same are incorporated herein by reference.

I claim:

1. In a process for recovering propylene oxide in a high state of purity from a crude propylene oxide product obtained by the catalytic epoxidation of propylene with an organic hydroperoxide, said product including propylene, propylene oxide, acetaldehyde, propionaldehyde, and other material having a higher boiling point than that of propylene oxide, the improvement consisting of the sequential steps of a. removing propylene by distillation from said product to obtain a substantially propylene-free crude propylene oxide product, followed by
  b. charging the said substantially propylene-free, crude propylene oxide product into a first fractionator, withdrawing therefrom a first distillation overhead containing acetaldehyde, and withdrawing therefrom a first distillation bottoms containing propylene oxide, propionaldehyde, and said material having a higher boiling point than that of propylene oxide, followed by
  c. charging the said first distillation bottoms to a second fractionator, withdrawing therefrom a second distillation overhead containing propylene oxide substantially free of aldehydes and of said higher boiling material, and withdrawing therefrom a second distillation bottoms containing said higher boiling material.

2. The process of claim 1, wherein said first fractionator is operated at a bottom zone temperature of from about 35°C. to about 100°C.

3. The process of claim 1, wherein said second fractionator is operated at a bottom zone temperature of from about 50°C. to about 100°C.

4. The process of claim 1, wherein said second fractionator is operated at a bottom zone temperature of from about 60°C. to about 90°C.

5. The process of claim 1, wherein said substantially propylene-free, crude propylene oxide product also contains water, which is withdrawn from said second fractionator in said second distillation bottoms.

6. The process of claim 1, wherein said organic hydroperoxide is ethylbenzene hydroperoxide.

* * * * *